United States Patent
Krugman et al.

(10) Patent No.: US 6,893,349 B2
(45) Date of Patent: May 17, 2005

(54) ASSEMBLY FOR BALANCING A SHAFT ASSEMBLY WITH MISBUILD PREVENTION DEVICE

(75) Inventors: Mark Krugman, Birmingham, MI (US); Peter Thompson, Livonia, MI (US); Anthony R. Badolato, Dearborn, MI (US); Ron Pewinski, Washington, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/366,732

(22) Filed: Feb. 14, 2003

(65) Prior Publication Data

US 2004/0162148 A1 Aug. 19, 2004

(51) Int. Cl.[7] ............................................. F16D 1/06
(52) U.S. Cl. ............................................ 464/23; 464/182
(58) Field of Search ........................... 403/13, 14, 27, 403/337; 464/23, 182; 285/914

(56) References Cited

U.S. PATENT DOCUMENTS

| | | | |
|---|---|---|---|
| 2,796,748 A | * | 6/1957 | Sheppard .................... 464/182 |
| 3,343,612 A | * | 9/1967 | Flowers .................... 403/337 X |
| 3,497,083 A | * | 2/1970 | Anderson et al. ....... 464/182 X |
| 4,253,776 A | * | 3/1981 | Orain ......................... 403/337 |
| 4,468,174 A | * | 8/1984 | Pryor ..................... 403/337 X |
| 5,401,062 A | * | 3/1995 | Vowles |
| 5,431,049 A | | 7/1995 | Kopp |
| 5,760,302 A | | 6/1998 | Moradi et al. |
| 5,767,403 A | | 6/1998 | Kopp et al. |
| 5,877,420 A | | 3/1999 | Moradi et al. |
| 5,922,952 A | | 7/1999 | Moradi et al. |
| 6,083,108 A | | 7/2000 | Grubish |
| 6,345,826 B1 | | 2/2002 | Kurzeja et al. |
| 6,475,091 B1 | * | 11/2002 | Sugiura et al. ............... 464/23 |

* cited by examiner

*Primary Examiner*—Greg Binda
(74) *Attorney, Agent, or Firm*—Dickinson Wright PLLC

(57) ABSTRACT

A torque transfer assembly having a first rotatable element with a first flange, a second rotatable element with a second flange, and an alignment assembly establishing a single coupled orientation for the first and second rotatable elements. First and second imbalance vectors, corresponding to the first and second rotatable elements respectively, each include a magnitude and direction relative to the reference axis which are in balancing alignment when the rotatable elements are in the coupled orientation.

6 Claims, 4 Drawing Sheets

ASSEMBLY FOR BALANCING A SHAFT ASSEMBLY WITH MISBUILD PREVENTION DEVICE

BACKGROUND OF THE INVENTION

Rotating shafts are used in a variety of power transfer applications. For example, in automobiles and other powered vehicles, rotatable shafts are used to transfer torque between the engine and the transmission, the transmission and various differential or transfer cases, and to vehicle drive axle shafts. In each of these and other analogous situations, the rotational balance of the rotating elements impact the durability of the elements and associated components. Further, unbalanced rotating elements may contribute to increased noise, vibration, and harshness during vehicle operation.

With respect to components of a vehicle drive train, and particularly the rotational coupling of the driveshaft and axle companion flange, traditional vehicle axle and driveshaft balancing techniques include balancing axles by removing material, such as by drilling, from the outer diameter of the companion flange. Driveshafts are balanced by welding or otherwise adding weight to the outer diameter of the driveshaft tubing. The residual imbalance vector of each component includes a magnitude, commonly measured in a mass at a radius, and a direction, measured as an angular location within the component's plane of rotation. The angular location of the imbalance may be manually or automatically marked on the axle or shaft. During assembly in the vehicle, the operator uses the various potential attachment orientations to vectorially oppose, as closely as possible, the locations of the highest imbalance on the axle and the highest imbalance on the driveshaft. However, with the limited number of assembly orientations, optimal alignment is often impossible. Additionally, as the alignment is commonly performed manually and requires judgment by the operator, human error may result in undesirable misalignments.

SUMMARY OF THE INVENTION

In view of the above, the present invention is directed to an apparatus for achieving more precise balanced alignment of rotatable elements, such as vehicle drive train components including driveshafts and axles. In general, the invention achieves improvements over traditional balancing techniques by directing the imbalance vectors of the rotatable elements to opposed angular locations within the plane of rotation and matching the vector magnitudes. A further feature of the present invention is the use of a misbuild prevention fastener that reduces or eliminates the required judgment on the part of the operator and associated potential for error during assembly.

The apparatus of the present invention may include a torque transfer assembly having a first rotatable element with a first flange, a second rotatable element with a second flange, and an alignment assembly establishing a coupled orientation for the first and second rotatable elements. First and second imbalance vectors, corresponding to the first and second rotatable elements respectively, each include a magnitude and direction relative to the reference axis which are in balancing alignment when the rotatable elements are in the coupled orientation. Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
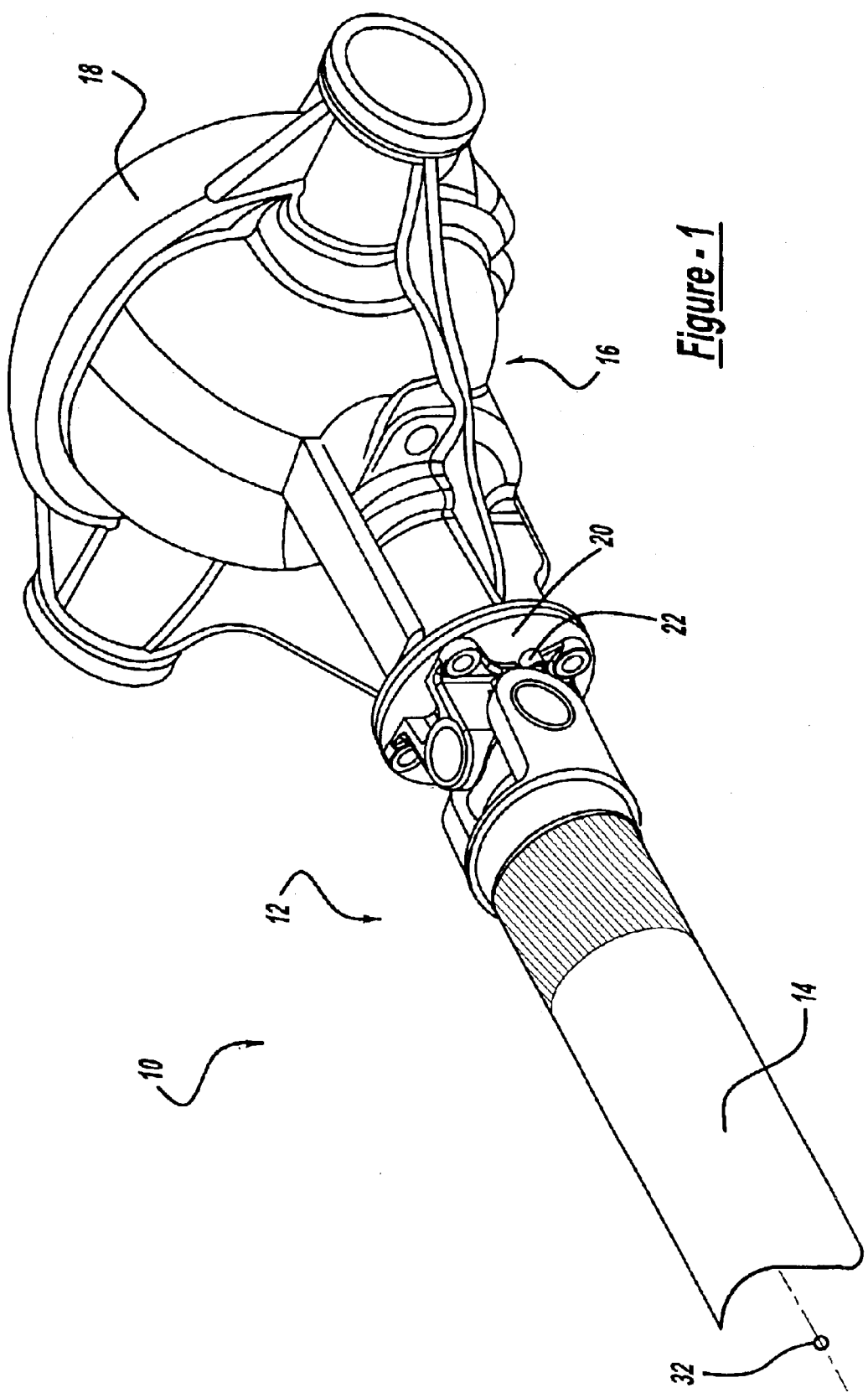
FIG. 1 is a perspective view of a portion of a drive train with the torque transfer assembly of the present invention.

The description and illustrations of the present invention contained herein refer specifically to a vehicle drive train 10 having a torque transfer assembly 12 with a driveshaft 14 and an axle assembly 16. In the illustrated embodiment, the axle assembly 16 includes a stationary housing 18 and a companion flange 20 rotatable relative to the housing for receiving or transmitting torque from or to the driveshaft 14. As noted above, it is desirable to minimize or eliminate the rotational imbalance of the rotationally coupled driveshaft and companion flange. To this end, the assembly 12 also includes a misbuild prevention device 22 that establishes the assembled or coupled orientation of the driveshaft and axle flange. Notwithstanding this illustrative driveshaft/axle flange example, those skilled in the art will appreciate that the invention is equally applicable in a variety of instances where two rotatable flanged elements with residual imbalances are to be rotationally coupled to one another. Thus, the claims appended hereto are directed to use of the invention with a driveshaft and axle as well as, more generally, to first and second rotatable elements. By way of illustration rather than limitation, it is noted that the present invention is specifically contemplated for use with shafts having circular flanges, constant velocity (CV) joints, universal joints, and other coupled and balanced rotatable shafts that transmit torque in a vehicle drivetrain.

Prior to balancing, each of the driveshaft and rotational components of the axle carrier (e.g., the axle companion flange and shaft) have a residual imbalance vector with a magnitude and direction. The apparatus and method of the present invention seeks to establish the magnitude (mass and radius) of the imbalance on the respective components to be approximately equal and to align the direction of the vectors to oppose one another thereby canceling the residual imbalances in the assembly. A further feature of the design facilitates manufacturing alignment to prevent misassembly of the axle and driveshaft. Stated differently, the method of the present invention generally includes (a) matching the mass and radius of the imbalance vectors and (b) establishing the orientation of the driveshaft and axle companion flange in the assembly so that the direction of the imbalance vectors are at opposed angular locations within the plane of rotation. This method and the associated assembly provides the optimal vector alignment for balancing the assembly.

Returning now to a detailed description of the illustrated embodiment, the companion flange 20 is rotatable relative to the housing 18 and is generally fixed to rotate with a geared shaft (not shown) or other elements rotatable within the housing 18 for transferring torque, such as to the wheel axles. The companion flange 20 is shown to have a generally circular configuration with first fastener holes 30 (FIGS. 2–4) arranged in a predetermined circumferentially spaced pattern at a constant radial distance from the axis of rotation 32. Notwithstanding this representative illustration of the preferred embodiment, those skilled in the art will appreciate that irregular or asymmetrical flange shapes, as well as fastener hole patterns that are irregular or at different radii, may also be used.

The driveshaft 14 includes a driveshaft tubing 34, a tube yoke 36 rotating with the tubing, a flange yoke 38, and a universal joint trunnion assembly 40 that couples the flange yoke to the tube yoke such that the flange yoke rotates with and pivots relative to the tube yoke. The flange yoke 38 includes a base flange 42 (FIGS. 2 and 5) with second fastener holes 44 spaced from the axis of rotation 32 to align with the first fastener holes 30 in the companion flange 20 when the flange yoke 38 and companion flange 20 are in proper coupling alignment. Fasteners, such as threaded bolts and nuts, may be disposed in and through the first and second fastener holes to rotationally couple the flange yoke 38 to the companion flange 20. Of course, coupling assemblies other than the illustrated or described holes and fasteners may be used without departing from the scope of the invention.

Figure 2:
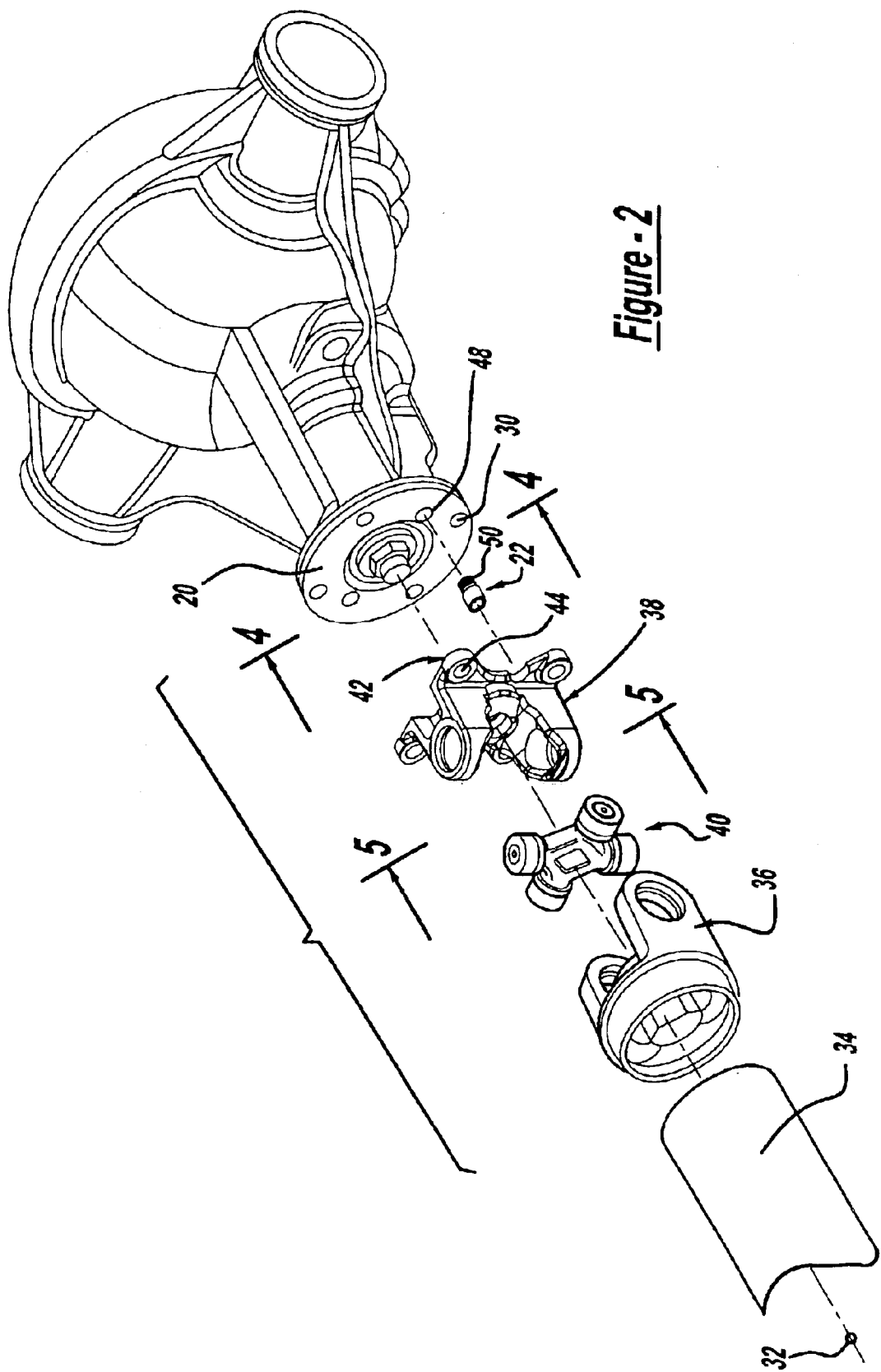
FIG. 2 is an exploded perspective view of the torque transfer assembly shown in FIG. 1.
Figure 3:
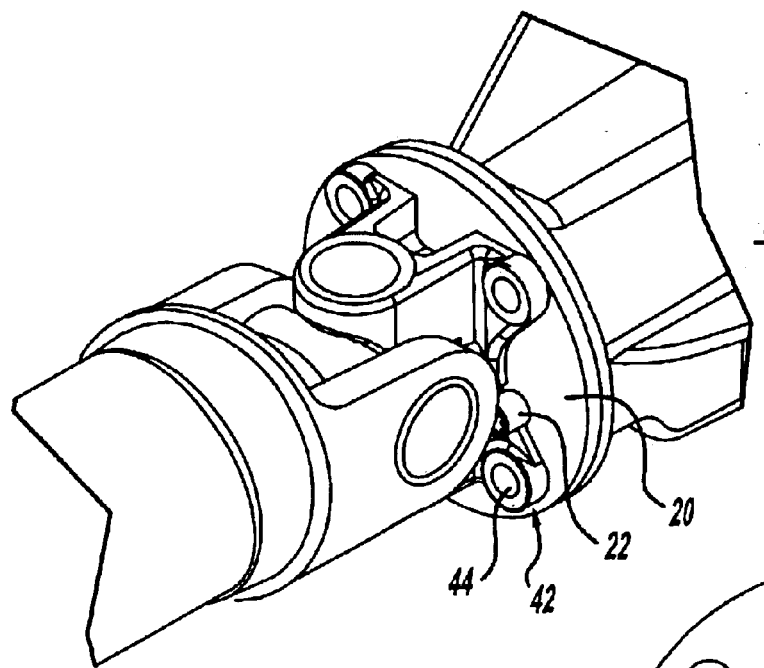
FIG. 3 is an enlarged perspective view of a portion of the torque transfer assembly shown in FIG. 1.
Figure 4:
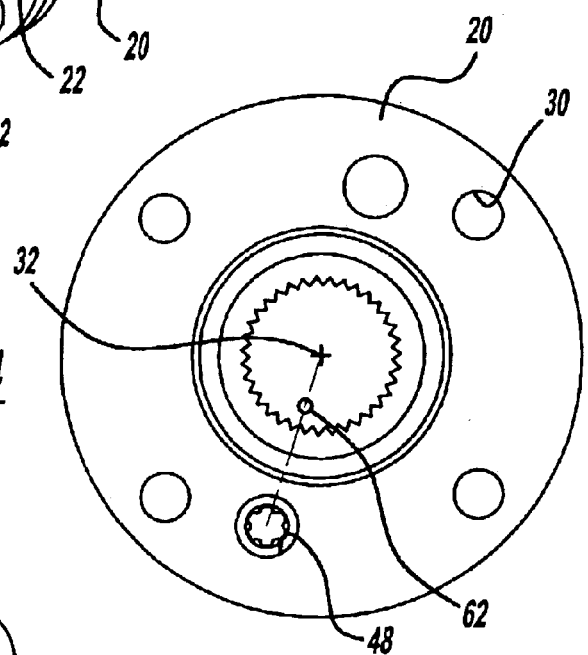
FIG. 4 is a front elevational view of the axle companion flange as shown by the line 4—4 in FIG. 2.

The base flange 42 (also more generally referred to herein as a second flange), while capable of having a variety of configurations, is generally illustrated to be symmetrical about the rotational axis 32 and to include four lobes 45 (FIG. 5) within which the second fastener holes 44 are formed. The base flange 42 includes a notch 46 that is preferably, though not necessarily, machined or cast in the flange. The companion flange 20 (also more generally referred to herein as a first flange) includes an alignment hole 48 (FIGS. 2 and 4). The hole 48, notch 46, and device 22 are oriented and/or configured such that the misbuild prevention device 22 is disposable in the hole 48 and notch 46, and the first fastener holes 30 in said companion flange 20 align with the second fastener holes 44 in the base flange 42, only when the driveshaft 14 and companion flange 20 are in a single predetermined coupled orientation. That is, while the first and second fastener holes 30 and 44 may be alignable with one another in two or more flange orientations, only one such orientation also sufficiently aligns the notch 46 with the alignment hole 48 so as to receive the misbuild prevention device 22.

The notch 46 and alignment hole 48 may also have a variety of configurations. In the illustrated embodiment, the alignment hole 48 is positioned radially inward of the first fastener holes 30 and the notch 46 has a semi-circular shape. For manufacturing simplicity, the alignment hole 48 may be formed by tapping or otherwise threading an aperture commonly used to spin the axle shaft during assembly operations. However, other attachment techniques for the misbuild prevention device (such as staking, roll forming, gluing, or press fitting the device in a smooth surface hole) may be used. Similarly, the notch 46 in the base flange 42 may also have a variety of configurations and shapes without departing from the scope of the invention defined by the appended claims.

In the illustrated embodiment, the misbuild prevention device 22 has a cylindrical shape with a threaded end 50 (FIG. 2) for coupling engagement with the threaded alignment hole 48. The device threads may be provided with a coating or other treatment to enhance the interlocking engagement between the threads and the companion flange in a manner generally known in the art. Finally, for completeness, it is noted that while the misbuild prevention device 22 is illustrated as a separate component, the prevention device may be formed integral with and to extend axially from either of the flanges 20 or 42 such as by casting or machining. For example, the flange yoke 38 or companion flange 20 may include an axially extending projection, detent, tab, or the like to engage an appropriately configured hole, aperture, or recess in the other component. Based on this description, other suitable misbuild prevention configurations will be readily apparent to those skilled in the art. The term alignment assembly as used in the appended claims is intended to encompass the alignment hole, notch, and misbuild prevention device described herein as well as other assemblies that may be used to align the flanges in their coupled orientation.

With the above description of the torque transfer assembly 12 in mind, the following is a description of a method for balancing the assembly. Again, while the method is described with reference to an assembly that includes the illustrated flanged driveshaft 14 and axle companion flange 20, it should be understood that the method may be used with a variety of alternative assemblies generally referred to herein as including first and second rotatable elements.

In general, the method of the present invention includes establishing an imbalance vector with a magnitude and direction for the driveshaft 14, establishing an imbalance vector with a magnitude and direction for the companion flange 20 and rotationally associated components, and coupling the driveshaft 14 to the companion flange 20 in a coupled orientation where the direction of the driveshaft imbalance vector is in balancing alignment with the direction of the axle imbalance vector. The steps of establishing the imbalance vectors preferably include the creation or inducement of an imbalance magnitude in or near a predetermined direction.

Figure 5:
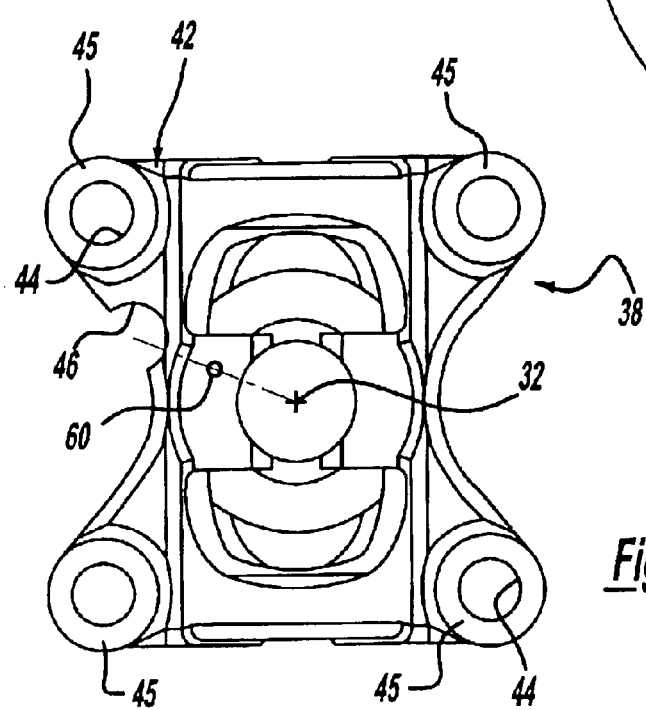
FIG. 5 is a front elevational view of the driveshaft flange yoke as shown by line 5—5 in FIG. 2.

In the embodiment described in detail herein, the creation of the notch 46 removes mass from the base flange 42 at a radius from the axis of rotation 32 thereby inducing or creating a residual imbalance vector for the driveshaft in a direction opposite a notch orientation line 60 (FIG. 5). An imbalance vector for the axle companion flange 20 may be controllably created by disposing the misbuild prevention device 22 in the alignment hole 48. The device 22 adds mass to the companion flange 20 at a radius from the axis of rotation 32 thereby inducing or creating a residual imbalance vector having a direction substantially aligned with the alignment line 62 of the flange 20 (FIG. 4). The direction and magnitude of the driveshaft and/or axle imbalance vectors may be further controlled, adjusted or optimized by adding or removing weight in appropriate locations such that the magnitude (mass and radius) of the imbalance vectors of the driveshaft and axle are approximately equal and the direction of the driveshaft and axle imbalance vectors are opposed when in their predetermined coupled orientation. For example, weight may be welded or otherwise coupled to the driveshaft or axle flange and/or removed therefrom such as by radially drilling or milling into the outer diameter of the flanges.

As is described above with reference to the illustrated embodiment, the notch 46, alignment hole 48 and misbuild prevention device 22 provide only one alignment that permits assembly of the driveshaft 14 to the axle companion flange 20. In this orientation, the vector imbalances of the driveshaft and axle are vectorally opposed and, with the vector magnitudes being approximately equal, the imbalance vector of the assembly is minimized or eliminated. For completeness, it is noted that a minimal imbalance (such as imbalances attributable to manufacturing tolerances of the mating assemblies, fasteners, or balance machine measurement error) may be present in the assembled torque transfer assembly. However, the present invention provides an improved apparatus and method for balancing rotatable flanged elements so as to minimize or eliminate the assembly imbalance.

Figure 6:
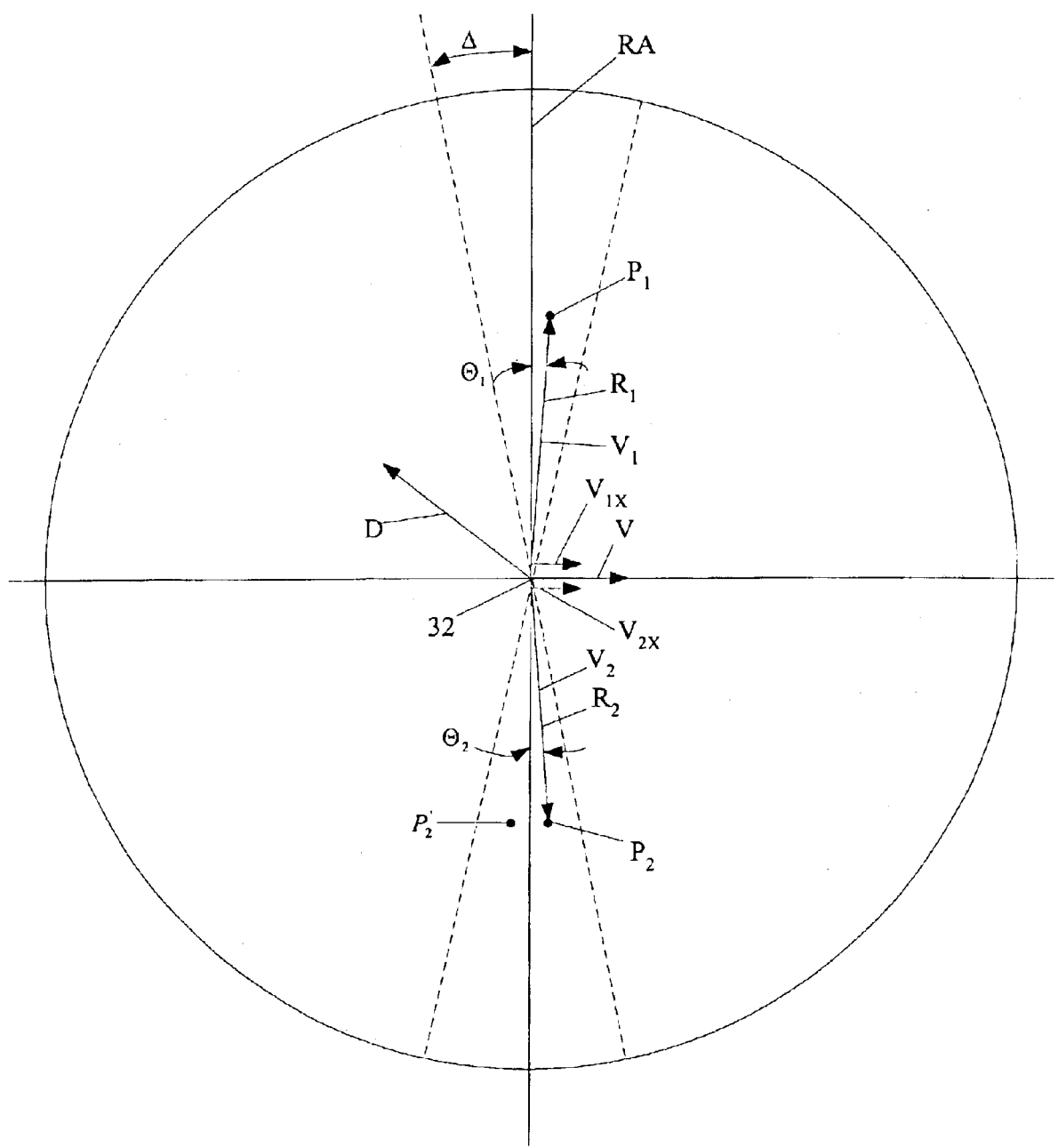
FIG. 6. schematically illustrates the balance vectors of the shafts and assembly.

The embodiment of the coupled shaft assembly described herein is provided for illustrative purposes with the understanding that the manner of establishing the location and magnitude of the imbalance vectors, as well as the predetermined coupled orientation of the shafts, may vary for specific shaft assemblies. As is shown in FIG. 6, imbalance vector V of the assembly is the vector sum of the first and second imbalance vectors $V_{1x}$ and $V_{2x}$, respectively, which are each a function of the angular offsets $\theta_1$ and $\theta_2$ of the imbalance points from the reference axis RA, the radial distances R1 and R2 of the imbalance point from the rotational axis 32, and the magnitude of the imbalance of each component. The imbalance points $P_1$ and $P_2$ of each shaft are preferably located at least a predetermined radial distance D from the axis of rotation 32 so as to ensure that the imbalances of each shaft effectively contribute to balancing the assembly. For example, if the imbalance points of the shafts were centered at the axis 32, the imbalance of each shaft would have no effect on the balance of the assembly. Those skilled in the art will appreciate that the radial distance D may also vary by application.

In the present invention, the orientation of the imbalance vector of each flanged shaft is also controlled relative to the reference axis RA. While it is of course desirable to ensure that the imbalance vectors are directly opposed (i.e., spaced 180 degrees from one another) so as to completely cancel one another, manufacturing operations may not be sufficiently precise to repeatedly achieve this desired orientation. This limitation is illustrated in FIG. 6 wherein the imbalance vectors $V_1$ and $V_2$ of the shafts are not directly opposed to one another but rather are located so as to each contribute in an additive fashion to the imbalance vector V of the assembly. Assuming $V_1$ is the imbalance vector of the first shaft, the desired location of the second imbalance vector is shown as point $P_2'$ in FIG. 6. Notwithstanding this limitation, the fact that the present invention establishes the reference axis RA based on the predetermined coupled orientation of the flanges provides a basis for controlling the vectorally opposed positions of the shafts after assembly. Thus, it is desirable to establish the angular offsets $\theta_1$ and $\theta_2$ of the imbalance vectors as close to zero relative to the reference axis (i.e., minimize Δ tolerance) and eliminate any differences between the magnitude and offset of the imbalance point so as to provide an imbalance vector V for the assembly that repeatedly satisfies manufacturing guidelines. As used herein, the term balancing alignment is intended to define the generally opposed relationship of the shaft imbalance vectors with the understanding that the vectors are approximately 180 degrees opposed to one another.

The present invention provides numerous advantages over conventional balancing techniques where operator error and limited coupling configurations restrict assembly accuracy. By way of example, the invention contemplates establishing the imbalance vector of each of the coupled shafts to effectively cancel one another in the predetermined assembled configuration. Moreover, it is commonplace to assemble drive trains for several vehicles in a single facility. In the present invention, the configuration of the mating flanges for each vehicle drive train may be unique so as to prevent misassembly of a drive train through use of components from other vehicle drive trains. Thus, the apparatus and method described herein facilitates accurate assembly of the rotating components and more effectively satisfies manufacturing goals for the rotational balance of the assembled shafts.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A torque transfer assembly comprising:

a first rotatable element having a first flange, said first rotatable element having a first imbalance vector with a magnitude and a direction relative to a reference axis;

a second rotatable element having a second flange, said second rotatable element having a second imbalance vector with a magnitude and direction relative to said reference axis;

an alignment assembly establishing a coupled orientation for the first and second rotatable elements, wherein said coupled orientation comprises a coupled arrangement of said first and second rotatable elements in which the direction of said first imbalance vector is in balancing alignment with said direction of said second imbalance vector; and a misbuild prevention device, wherein said misbuild prevent device inhibits coupling the first and second rotatable elements together in a coupled arrangement other than said coupled orientation.

2. The torque transfer assembly of claim 1 wherein said alignment assembly includes an alignment hole in said first flange, a notch in said second flange, and said misbuild prevention device is disposed in said notch and alignment hole to establish said coupled orientation.

3. The torque transfer assembly of claim 2 wherein said alignment hole is defined by a threaded passage and said misbuild prevention device has a threaded end for fastening engagement with said threaded passage.

4. The torque transfer assembly of claim 1 further comprising a coupling assembly, wherein said coupling assembly includes first faster holes in said first flange, second fastener holes in said second flange, and a fastener disposable in said first and second fastener holes.

5. The torque transfer assembly of claim 4 wherein the first rotatable element is an axle shaft and the second rotatable element is a driveshaft.

6. The torque transfer assembly of claim 1 wherein the magnitude of the first imbalance vector is approximately equal to the magnitude of the second imbalance vector.

* * * * *

UNITED STATES PATENT AND TRADEMARK OFFICE
CERTIFICATE OF CORRECTION

PATENT NO. : 6,893,349 B2  
DATED : May 17, 2005  
INVENTOR(S) : Mark Krugman et al.

It is certified that error appears in the above-identified patent and that said Letters Patent is hereby corrected as shown below:

Column 6,  
Line 56, "faster" should be -- fastener --.

Signed and Sealed this

Twelfth Day of July, 2005

JON W. DUDAS  
*Director of the United States Patent and Trademark Office*